United States Patent [19]

Sakaguchi et al.

[11] 3,988,250
[45] Oct. 26, 1976

[54] TONER COMPOSITION FOR USE IN ELECTROPHOTOGRAPHY COMPRISING NOVEL POLYESTER BINDER RESIN

[75] Inventors: Kahei Sakaguchi; Hirotaka Takemoto, both of Wakayama, Japan

[73] Assignee: Kao Soap Co., Ltd., Tokyo, Japan

[22] Filed: Dec. 27, 1974

[21] Appl. No.: 536,904

[30] Foreign Application Priority Data
Dec. 29, 1973  Japan.................................. 49-3685

[52] U.S. Cl.................... 252/62.1 R; 252/62.1 P; 252/62.1 L; 260/40 R; 260/75 N; 427/14; 427/19
[51] Int. Cl.².................... G03G 9/08; G03G 9/10; G03G 9/12
[58] Field of Search.................. 252/62.1; 260/75 N, 260/40 R; 427/14, 19

[56] References Cited
UNITED STATES PATENTS

| | | | |
|---|---|---|---|
| 3,575,901 | 4/1971 | Ashjian | 260/75 N |
| 3,590,000 | 6/1971 | Palermiti | 252/62.1 P |
| 3,681,106 | 8/1972 | Burns | 252/62.1 P |
| 3,817,932 | 6/1974 | Albers et al. | 260/75 N |
| 3,819,367 | 6/1974 | Chatterji et al. | 252/62.1 |
| 3,872,183 | 3/1975 | Keck | 260/75 N |

Primary Examiner—Mayer Weinblatt
Assistant Examiner—John D. Smith
Attorney, Agent, or Firm—Woodhams, Blanchard and Flynn

[57] ABSTRACT

A toner composition capable of being charged with a positive electrical charge and adapted for use in electrophotography which comprises 1 to 20 parts by weight of a colorant and 80 to 99 parts by weight of a resin, characterized in that said resin consists essentially of a. from 55 to 100% by weight of a polyester resin which has a softening point of 80° to 130° C. measured in accordance with ASTM-E28-51T (ring and ball method), which has a nitrogen content of from 0.2 to 2.5%, based on the weight thereof, and which is obtained by the reaction of;
  1. a dicarboxylic acid component containing 50 mol % or more of a dicarboxylic acid, or an anhydride thereof, selected from the group consisting of fumaric acid, maleic acid and succinic acid; with
  2. a polyol component containing 10 mol% or more of a glycol containing an amino group and having the formula

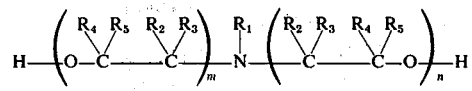

wherein $R_1$ is hydrogen, alkyl having from 1 to 20 carbon atoms, phenyl, naphthyl, or cyclohexyl, wherein $R_2$, $R_3$, $R_4$ and $R_5$, which can be the same or different, each is hydrogen or methyl, and wherein $m$ and $n$ are integers and the sum of $m$ plus $n$ is from 2 to 20; and b. the balance of said resin, i.e. from 0 to 45% by weight of said resin is a resin which has a softening point of 80° to 150° C. and is selected from the group consisting of polystyrene, rosin maleate, petroleum resin and epoxy resin.

10 Claims, No Drawings

3,988,250

TONER COMPOSITION FOR USE IN ELECTROPHOTOGRAPHY COMPRISING NOVEL POLYESTER BINDER RESIN

BACKGROUND OF THE INVENTION

1. Field of the Invention

This invention relates to a toner composition for use in electrophotography. More particularly, this invention relates to a toner composition for use in electrophotography which, in both indirect and direct developing methods of electrophotography, is uniformly charged with a strong positive electric charge thereby permitting clear development of negative electrostatic latent images without any fogging.

2. Description of the Prior Art

As is well known, xerography is a type of electrophotography which uses static electricity. It is disclosed in U.S. Pat. No. 2,297,691. Likewise there have been disclosed several methods (developing methods) of developing or making visible the electrostatic latent image which is formed on the surface of an insulating substance such as, for example, the cascade method disclosed in U.S. Pat. No. 2,618,552, and the magnetic brushing method disclosed in U.S. Pat. Nos. 2,874,063 and 2,764,441.

In the cascade method there is employed a colored resin powder (toner) and glass beads having a coarser particle size used as a carrier. A mixture of the toner and the carrier are dusted onto a sheet. In the magnetic brushing method, there are employed a toner and powders of magnetic substances such as iron powder used as a carrier. This carrier can be agitated by magnetic force. In both of these two methods the toner particles are electrically charged by friction and then they are attached onto an electrostatic latent image by means of electrostatic attraction.

As noted above, the toner is a colored resin powder. Generally, the following properties are required for a toner:

1. particles charged by friction by the cascade method or the magnetic brushing method should be charged uniformly either completely positive or completely negative; if both positive and negative charges are co-present in the same toner, there will occur such defects as the whiteness of the non-image background will be reduced, a trailing phenomenon will be observed, the co-presence of opposite images (co-presence of negative and positive image) will be seen, and indistinct edges will be formed on the developed images;
2. toner particles charged by friction should possess a sufficiently strong charge; otherwise the toner will not be strongly attracted to the image area and it will be dispersed so as thereby to pollute the inside of the developing apparatus;
3. electrification (or charging capability) of the toner should not be influenced greatly by humidity, rather it should always be substantially constant under varying humidity conditions to ensure stable charging;
4. desirably the toner should melt sharply at a relatively low temperature, but it should not cause blocking or be sticky at normal (20°–25° C) temperature. If a viscous resin is employed, the resulting toner will stick to the surfaces of the carrier and the photosensitive layer and will not provide a sharp and clear developed image. Accordingly, the life of the toner is also shortened as is well known;
5. the surface of the photosensitive layer should readily be washed;
6. it should be easy to pulverize;
7. it should have good abrasion resistance;
8. it should have good fixability to a sheet of paper to form a copy;
9. it should have proper fluidity;
10. the resin and the colorant should be capable of being mixed well so that the colorant can be dispersed uniformly in the resin; and
11. it should not generate an unpleasing smell or poisonous gases at the time of heat fixing.

When the non-exposed portion of the surface of the photosensitive layer, prior to the developing step, is charged with a negative electric charge after electrification and exposure, a positive picture image cannot be obtained unless it is developed with a toner which is charged with a positive electric charge. Most resin powders imparted with friction by the cascade method using glass beads as the carrier or by the magnetic brushing method using iron powder as the carrier are charged with a negative electric charge, and very few are charged with a positive electric charge.

As positive charging toners, there have heretofore been proposed several compositions wherein a colorant (e.g. carbon black) and a charge-control agent are blended with a thermoplastic resin. A two-component system toner consisting of a colorant and a thermoplastic resin such as polyester or polystyrene resin and not containing a charge-control agent, can be charged with only a very small negative charge or positive charge by friction thereof with the carrier. In order to impart to the toner a strong negative charge or strong positive charge, there have also been proposed, and used in practice, several methods. To give a strong negative charge, for example, in the method disclosed in Japanese patent publication No. 26478/70 an azo-type oil soluble dye containing a complex of chromium is added as a charge-control agent. Alternatively, in order to give a strong positive charge, a basic dye is added.

Generally, however, these additives do not admix well in a thermoplastic resin; hence, uniform electric charging, either negative or positive, on the surface of the toner particles can scarcely be effected. This causes such major problems as fogging of the images at the time of development, trailing phenomenon, or indistinct images (blurred images), and so forth.

SUMMARY OF THE INVENTION

It is, therefore, an object of this invention to provide a toner composition for use in electrophotography wherein fine toner particles are, as a whole, uniformly charged with a strong positive electric charge, thereby providing a clear and sharp image at the time of development by either the direct or indirect developing method, wherein the development is effected in accordance either with the cascade method or with the magnetic brushing method.

Another object of this invention is to provide a toner composition which adequately satisfies the general requirements for a toner as noted in the foregoing paragraphs.

It is still another object of this invention to provide an improved toner composition which does not incur the abovementioned fogging phenomenon and the like, and which does not require the addition thereto of a charge-control agent.

We have discovered a thermoplastic resin having a specific chemical structure and which, critically, can be charged with a strong and uniform positive electric charge when used under specific conditions. Based on this discovery, this invention provides a toner composition which can be sufficiently charged with a strong and uniform positive electric charge without requiring the addition thereto of a charge-control agent. This invention employs as the thermoplastic binder resin a saturated or unsaturated polyester resin containing an amino group in its molecule.

In accordance with this invention, there is provided a toner composition for use in electrophotographic development which can be charged with a strong and uniform positive electric charge and which adequately satisfies the other properties required for a toner composition as mentioned in the foregoing paragraphs.

According to the invention, there is provided a toner composition, capable of being charged positive, and adapted for use in electrophotographic development, which comprises 1 to 20 parts by weight of a colorant and 80 to 99 parts by weight of a resin composition, characterized in that the resin composition consists essentially of
  a. from 55 to 100 % by weight of a polyester resin (first resin component) which has a softening point of 80° to 130° C. measured in accordance with ASTM-E28-51T (ring and ball method), which has a nitrogen content of from 0.2 to 2.5 %, based on total weight of the polyester resin, and which is obtained by the reaction of;
    1. a dicarboxylic acid component containing 50 mol % or more of a dicarboxylic acid, or an anhydride thereof, selected from the group consisting of fumaric acid, maleic acid, succinic acid, maleic anhydride and succinic anhydride; with
    2. a polyol component containing 10 mol % or more of a glycol containing an amino group and having the formula

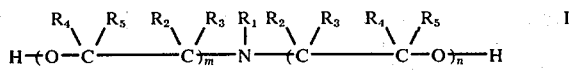

wherein $R_1$ is hydrogen, alkyl having one to 2 carbon atoms, phenyl, naphthyl or cyclohexyl, wherein $R_2$, $R_3$, $R_4$ and $R_5$, which can be the same or different, each is hydrogen or methyl, and wherein $m$ and $n$ are integers and the sum of $m$ plus $n$ is from 2 to 20; and
  b. the balance of the resin composition, i.e. from 0 to 45 % by weight of said resin composition, is a resin (optional second resin component) which has a softening point of 80° to 150° C. and is selected from the group consisting of polystyrene, rosin maleate, petroleum resin and epoxy resin.

Referring to the polyol component (2), it is critical that this consists of from 10 to 100 mol percent of a glycol of formula (I). Typical examples of glycols containing amino groups of formula (I), include, for example:

In the case when $m + n = 2$:
  diethanolamine, N-alkyl diethanolamine, N-phenyl diethanolamine, N-naphthyl diethanolamine, N-cyclohexyl diethanolamine, diisopropanolamine, N-alkyldiisopropanolamine, N-cyclohexyl diisopropanolamine, and the like.

In the case when $2 < n + m \leqq 20$:
  dipolyoxyethyleneamine, N-alkyl dipolyoxyethyleneamine, N-phenyl dipolyoxyethyleneamine, N-naphthyl dipolyoxyethyleneamine, N-cyclohexyl dipolyoxyethyleneamine, dipolyoxypropyleneamine, N-alkyl dipolyoxypropyleneamine, N-phenyl dipolyoxypropyleneamine, N-naphthyl dipolyoxypropyleneamine, N-cyclohexyl dipolyoxypropyleneamine, and the like.

The balance of the polyol component (2), i.e. from 0 to 90 mol percent thereof, consists of one or more polyester-forming polyols, such as ethyleneglycol, diethyleneglycol, triethyleneglycol, 1, 2-propyleneglycol, 1, 4-butanediol, neopentylglycol, 1, 4-bis (hydroxymethyl) cyclohexane, hydrogenated bisphenol A, polyoxyalkylene-bisphenol A, polyoxyalkylene-hydrogeneted bisphenol A, glycerine, pentaerythritol and the like.

As the dicarboxylic acid component (1) which is used for the preparation of the polyester resin in this invention, it is critical that this consists of 50 to 100 mol percent of fumaric acid, maleic acid or succinic acid, or an anhydride of these acids. The balance of the dicarboxylic acid component (1), i.e. from zero to 50 mol percent thereof, consists of one or more other unsaturated or saturated, aliphatic or aromatic, hydrocarbon dicarboxylic acids, or anhydrides thereof, such as itaconic acid, phthalic acid, isophthalic acid, terephthalic acid, cyclohexanedicarboxylic acid, adipic acid, sebacic acid, malonic acid, oxalic acid and the like.

In order to effectively charge the toner with a positive electric charge, the nitrogen content in the polyester resin (a) used in this invention is maintained in the range from 0.2 to 2.5 by weight, preferably 0.3 to 2.5 % by weight. In the polyester resin (a) employed in the present invention, the maximum content of nitrogen is 2.5 % by weight.

The polyesterification reaction is carried out by employing a ratio, by equivalent, of the polyol component to the dicarboxylic acid in the range of 0.8 to 1.2/1.0, preferably 1/1, at a reaction temperature of 160° to 210° C. in a stream of an inert gas (e.g. nitrogen gas), and carrying out the reaction until the acid value of the resulting polyester is below 50 so as to yield a polyester having a softening point of 80° to 130° C.

The toner composition in accordance with the present invention comprises the abovementioned polyester resin and a colorant, and if desired, can further optionally contain conventional toner resins having a softening point of 80° to 150° C. such as polystyrene, rosin maleate, petroleum resin, epoxy resin and the like. The toner composition can further optionally contain, if required, a small amount of a charge-control agent, plasticizer, filler, etc. It is required that the polyester resin (a) is from 55 to 100 % by weight, based on the total weight of resins used in the toner composition. The balance of the resins, i.e. from 0 to 45 % by weight thereof, is one or more of the conventional binder resins for toner compositions.

As the colorant, a pigment or a dye can be used singly or as a mixture of two or more of them. The colorant employed is not critical and any conventional colorant for toners for electrophotography can be employed. Examples of suitable pigments include carbon black, prussian blue, rouge, cadmium yellow and the like. Likewise examples of suitable dyes are naphthol B, Eriochrome B, phthalocyanine blue, Lithol Rubin and the like.

The above-mentioned colorant is used in an amount of from 1 to 20 % by weight, preferably 3 to 10 % by weight, based on the total weight of the toner composition.

The toner composition of the present invention can be prepared either by the liquid spray method or by the pulverization method, both of which are conventional methods. In the case of the liquid spray method, a mixture of the resin and the colorant is dissolved in a solvent such as carbon tetrachloride, thereafter the resulting solution is sprayed, granulated into finely divided particles, dried and then recovered by electric titration. In the case of the pulverization method, a mixture of the resin and the colorant that has been dissolved and blended uniformly is further pulverized by a jet pulverizer to afford powders having a particle size of 5 to 20 microns.

The toner composition can be blended with glass beads or iron powders to form dry developers. The amount of glass beads or iron powder can be in the range conventionally employed, e.g. from 10 to 100 parts of glass beads or iron powder, per one part of toner composition.

The toner in accordance with this invention can be used not only for dry developing, i.e. as a dry powder, but also for a liquid developing agent for electrophotography wherein the toner is dispersed in an insulating liquid. In this case, too, the toner is charged positively in the liquid and develops or renders visible a negatively charged electrostatic latent image to afford a positive picture. The carrier liquid is conventional, normally a liquid hydrocarbon having an intrinsic resistivity of more than $10^9$ $\Omega$.cm and a dielectric constant of less than 3. The amount of the carrier liquid is in the range conventionally employed e.g. from 10 to 100 parts by weight of carrier liquid, per one part of toner composition.

The invention will be further described by reference to the following illustrative Synthesis Examples, Examples and Comparative Examples.

SYNTHESIS EXAMPLES 1–15

A 1-liter four-necked flask made of glass and equipped with a stirrer, a nitrogen-introducing pipe, a water-removal pipe and a thermometer is charged with the starting materials indicated respectively in the following Table 1. Under a stream of nitrogen, and while distilling off the resulting water from the reaction system, the reaction is carried out at 170° to 200° C. to yield a polyester resin.

The acid value, softening point and the nitrogen content of each of the polyester resins thus prepared are shown in Table 1.

Table 1

| Synthesis Example No. 1 | Composition fed | | | Analytical value of Polyester | | |
|---|---|---|---|---|---|---|
| | Starting Material | Weight (g) | Moles | Acid Value | Softening Point (° C) | N (wt. %) |
| 1 | DEA | 105.1 | 1.0 | 29 | 108 | 2.26 |
| | PO(2.2)BPA | 354.0 | 1.0 | | | |
| | FA | 232.2 | 2.0 | | | |
| | HQ | 0.8 | | | | |
| 2 | DIPA | 133.2 | 1.0 | 40 | 107 | 2.16 |
| | PO(2.2)BPA | 354.0 | 1.0 | | | |
| | FA | 232.2 | 2.0 | | | |
| | HQ | 0.26 | | | | |
| 3 | DEA | 15.8 | 0.15 | 26 | 106 | 0.34 |
| | PO(2.2)BPA | 477.9 | 1.35 | | | |
| | FA | 174.2 | 1.5 | | | |
| | HQ | 0.27 | | | | |
| 4 | DEA | 15.8 | 0.15 | 30 | 95 | 0.33 |
| | PO(2.2)BPA | 477.9 | 1.35 | | | |
| | MA | 117.7 | 1.20 | | | |
| | PA | 44.4 | 0.30 | | | |
| | HQ | 0.26 | | | | |
| 5 | DEA | 15.8 | 0.15 | 33 | 98 | 0.33 |
| | PO(2.2)BPA | 477.9 | 1.35 | | | |
| | MA | 117.7 | 1.20 | | | |
| | IPA | 49.8 | 0.30 | | | |
| | HQ | 0.26 | | | | |
| 6 | DEA | 42.0 | 0.40 | 22 | 101 | 0.87 |
| | PO(2.2)BPA | 283.2 | 0.80 | | | |
| | NPG | 83.4 | 0.80 | | | |
| | FA | 232.2 | 2.0 | | | |
| | HQ | 0.26 | | | | |
| 7 | DEA | 105.1 | 1.0 | 30 | 110 | 2.25 |
| | PO(2.2)BPA | 354.0 | 1.0 | | | |
| | SA | 236.2 | 2.0 | | | |
| | HQ | 0.28 | | | | |
| 8 | DEA | 42.0 | 0.40 | 23 | 99 | 0.90 |
| | PO(2.2)BPA | 283.2 | 0.80 | | | |
| | PG | 60.9 | 0.80 | | | |
| | FA | 232.2 | 2.0 | | | |
| | HQ | 0.25 | | | | |
| 9 | DEA | 42.0 | 0.40 | 21 | 101 | 1.05 |
| | PO(2.2)BPA | 283.2 | 0.80 | | | |
| | EG | 49.7 | 0.80 | | | |
| | HQ | 0.24 | | | | |
| | FA | 232.2 | 2.0 | | | |
| 10 | DEA | 15.8 | 0.15 | 20 | 105 | 0.32 |
| | PO(2.2)BPA | 451.4 | 1.275 | | | |
| | Gly | 6.9 | 0.075 | | | |
| | FA | 174.2 | 1.5 | | | |
| | HQ | 0.26 | | | | |
| 11 | DIPA | 20.0 | 0.15 | 30 | 102 | 0.31 |
| | PO(2.2)BPA | 477.9 | 1.35 | | | |
| | FA | 174.2 | 1.50 | | | |
| | HQ | 0.27 | | | | |

Table 1-continued

| Synthesis Example No. 1 | Composition fed | | | Analytical value of Polyester | | |
|---|---|---|---|---|---|---|
| | Starting Material | Weight (g) | Moles | Acid Value | Softening Point (°C) | N (wt. %) |
| 12 | LDEA | 41.0 | 0.15 | 20 | 88 | 0.30 |
| | PO(2.2)BPA | 477.9 | 1.35 | | | |
| | FA | 174.2 | 1.5 | | | |
| | HQ | 0.28 | | | | |
| 13 | DEA | 42.0 | 0.40 | 28 | 115 | 0.75 |
| | PO(2.2)BPA | 283.2 | 0.80 | | | |
| | HBPA | 192.0 | 0.80 | | | |
| | FA | 232.2 | 2.0 | | | |
| | HQ | 0.29 | | | | |
| 14 | DIPA | 53.3 | 0.40 | 31 | 110 | 0.74 |
| | PO(2.2)BPA | 283.2 | 0.80 | | | |
| | HBPA | 192.0 | 0.80 | | | |
| | FA | 232.2 | 2.0 | | | |
| | HQ | 0.30 | | | | |
| 15 | LDEA | 109.4 | 0.40 | 25 | 102 | 0.69 |
| | PO(2.2)BPA | 232.2 | 0.80 | | | |
| | HBPA | 192.0 | 0.80 | | | |
| | FA | 232.2 | 2.0 | | | |
| | HQ | 0.33 | | | | |

Remarks:
The abbreviations of the starting materials in the foregoing Table identify the following compounds:
 DEA: diethanolamine
 DIPA: diisopropanolamine
 LDEA: lauryldiethanolamine
 PO(2.2)BPA: polyoxypropylene(2.2)-2, 2-bis(4-hydroxyphenyl) propane
 NPG: neopentylglycol
 PG: propyleneglycol
 EG: ethyleneglycol
 Gly: glycerine
 HBPA: hydrogenated bisphenol A, (2,2-bis(4-cyclohexanol)propane)
 FA: fumaric acid
 MA: maleic anhydride
 SA: succinic acid
 IPA: isophthalic acid
 HQ: hydroquinone
(Throughout all the Synthesis Examples, hydroquinone is used in an amount of 0.04 percent by weight based on the total weight fed.)

COMPARATIVE EXAMPLE 1

90 Parts by weight of polystyrene (a product of Esso Standard Co., "Picolastic D125" (softening point = 125° C.)) is melt-blended with 10 parts by weight of carbon black on a heated roll, and after cooling and pulverizing, the mixture is further pulverized into finely divided particles to obtain a toner having a particle size of 5 to 20 microns.

Two parts by weight of the resulting toner is mixed with 100 parts by weight of iron powder (200–300 mesh) as a Control toner.

Using the Control toner composition, an electrophotosensitive sheet having a photosensitive layer of zinc oxide which forms a negatively charged electrostatic latent image, is developed by a magnetic brushing method. Although a negative picture is obtained, the intended positive picture cannot be obtained. The results are shown in the following Table 2.

COMPARATIVE EXAMPLES 2–4

Comparative Example 1 is repeated except that rosin maleate (softening point = 110° C.), petroleum resin (softening point = 90° C.) and epoxy resin (Dow Chemical, DER 667 epoxy resin (softening point = 127° C.)) are respectively used in place of polystyrene in Comparative Example 1. The results are shown in the following Table 2.

EXAMPLES 1–23

Toners having the respective compositions shown in Table 2 are prepared in the same way as in Comparative Example 1. These toners are used for development by means of a magnetic brushing method to compare the results with Comparative Examples 1–4. The results are shown in the following Table 2.

Table 2

| Example | | Resin | (parts by weight) | Carbon Black (parts by weight) | Electrification capability of Toner*1 | Image Character | | | Overall Life (time) *2 | Evaluation (point) |
|---|---|---|---|---|---|---|---|---|---|---|
| | | | | | | Positive or Negative | Density | Fog | | |
| Comparative | 1 | Polystyrene | 90 | 10 | weakly negatively charged | negative image | light | yes | 1,000 | 0 |
| | 2 | Rosin Maleate | 90 | 10 | weakly negatively charged | negative image | light | yes | 1,000 | 0 |
| | 3 | Petroleum Resin | 90 | 10 | negatively charged | negative image | dense | yes | 1,000 | 0 |
| | 4 | Epoxy Resin | 90 | 10 | weakly positively charged | positive image | light | yes | 2,000 | 30 |
| Example | 1 | Resin of Synthesis Example 1 | 90 | 10 | positively charged | positive image | dense | no | 20,000 | 100 |
| | 2 | Resin of Synthesis Example 2 | 90 | 10 | positively charged | positive image | dense | no | 20,000 | 100 |
| | 3 | Resin of Synthesis Example 3 | 90 | 10 | positively charged | positive image | dense | no | 20,000 | 90 |
| | 4 | Resin of Synthesis Example 4 | 90 | 10 | positively charged | positive image | dense | no | 20,000 | 90 |

Table 2-continued

| Example | Resin | (parts by weight) | Carbon Black (parts by weight) | Electrification capability of Ioner*1 | Image Character Positive or Negative | Density | Fog | Overall Life (time) *2 | Evaluation (point) |
|---|---|---|---|---|---|---|---|---|---|
| 5 | Resin of Synthesis Example 5 | 90 | 10 | positively charged | positive image | dense | no | 20,000 | 90 |
| 6 | Resin of Synthesis Example 6 | 90 | 10 | positively charged | positive image | dense | no | 20,000 | 95 |
| 7 | Resin of Synthesis Example 7 | 90 | 10 | positively charged | positive image | dense | no | 20,000 | 100 |
| 8 | Resin of Synthesis Example 8 | 90 | 10 | positively charged | positive image | dense | no | 20,000 | 95 |
| 9 | Resin of Synthesis Example 9 | 90 | 10 | positively charged | positive image | dense | no | 20,000 | 100 |
| 10 | Resin of Synthesis Example 10 | 90 | 10 | positively charged | positive image | dense | no | 20,000 | 90 |
| 11 | Resin of Synthesis Example 11 | 90 | 10 | positively charged | positive image | dense | no | 20,000 | 90 |
| 12 | Resin of Synthesis Example 12 | 90 | 10 | positively charged | positive image | dense | no | 20,000 | 90 |
| 13 | Resin of Synthesis Example 13 | 90 | 10 | positively charged | positive image | dense | no | 20,000 | 95 |
| 14 | Resin of Synthesis Example 14 | 90 | 10 | positively charged | positive image | dense | no | 20,000 | 95 |
| 15 | Resin of Synthesis Example 15 | 90 | 10 | positively charged | positive image | dense | no | 20,000 | 95 |
| 16 | Resin of Synthesis Example 1 | 50 | | | | | | | |
| | Resin of Comparative Example 1 | 40 | 10 | positively charged | positive image | dense | no | 20,000 | 90 |
| 17 | Resin of Synthesis Example 1 | 70 | | | | | | | |
| | Resin of Comparative Example 1 | 20 | 10 | positively charged | positive image | dense | no | 20,000 | 90 |
| 18 | Resin of Synthesis Example 1 | 50 | | | | | | | |
| | Resin of Comparative Example 2 | 40 | 10 | positively charged | positive image | dense | no | 20,000 | 90 |
| 19 | Resin of Synthesis Example 1 | 70 | | | | | | | |
| | Resin of Comparative Example 2 | 20 | 10 | positively charged | positive image | dense | no | 20,000 | 90 |
| 20 | Resin of Synthesis Example 1 | 50 | | | | | | | |
| | Resin of Comparative Example 3 | 40 | 10 | positively charged | positive image | dense | no | 20,000 | 90 |
| 21 | Resin of Synthesis Example 1 | 70 | | | | | | | |
| | Resin of Comparative Example 3 | 20 | 10 | positively charged | positive image | dense | no | 20,000 | 90 |
| 22 | Resin of Synthesis Example 1 | 50 | | | | | | | |
| | Resin of Comparative Example 4 | 40 | 10 | positively charged | positive image | dense | no | 20,000 | 95 |
| 23 | Resin of Synthesis Example 1 | 70 | | | | | | | |
| | Resin of Comparative Example 4 | 20 | 10 | positively charged | positive image | dense | no | 20,000 | 95 |

(E)
*1Determination is made by image character after developing a negatively charged electrostatic latent image.
*2Life is expressed by number of tims before a sharp picture cannot be obtained any more by the same toner.

The embodiments of the invention in which an exclusive property or privilege is claimed are defined as follows:

1. A toner composition capable of being charged with a positive electric charge and adapted for use in electrophotographic development, consisting essentially of finely divided particles containing from 1 to 20 parts by weight of a colorant and 80 to 99 parts by weight of binder resin, said binder resin consists essentially of a. from 55 to 100 percent by weight of a polyester resin having a softening point of 80° to 130° C. and a nitrogen content of from 0.2 to 2.5 percent by weight, based on the total weight of said polyester resin, said polyester resin being obtained by reacting 1. a dicarboxylic acid component consisting essentially of from 50 to 100 mol percent of a substance selected from the group consisting of fumaric acid, maleic acid, succinic acid and anhydrides thereof, the balance of said dicarboxylic acid component being one or more polyester-forming dicarboxylic acids, or anhydrides thereof, with 2. a polyol component consisting essentially of from 10 to 100 mol percent of a glycol having the formula

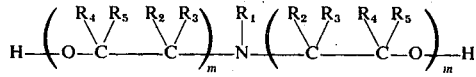

wherein R is hydrogen unsubstituted, alkyl having one to 20 carbon atoms, unsubstituted phenyl, unsubstituted naphthyl or unsubstituted cyclohexyl wherein $R_2$, $R_3$, $R_4$ and $R_5$, which are the same or different, are hydrogen or methyl, and wherein $m$ and $n$ are integers and the sum of $m$ plus $n$ is from 2 to 20, and the balance of said polyol component is one or more polyester-forming polyols, and b. the balance of said binder resin is a binder resin having a softening point of 80° to 150° C selected from the group consisting of polystyrene, rosin maleate, petroleum resin and epoxy resin.

2. A toner composition as claimed in claim 1, in which said polyester-forming dicarboxylic acids are selected from the group consisting of itaconic acid, phthalic acid, isophthalic acid, terephthalic acid, cyclohexanedicarboxylic acid, adipic acid, sebacic acid, malonic acid and oxalic acid.

3. A toner composition as claimed in claim 1 in which said polyester-forming polyol is selected from the group consisting of ethyleneglycol, diethyleneglycol, triethyleneglycol, 1,2-propanediol, 1,4-butanediol, neopentylglycol, 1,4-bis(hydroxymethyl) cyclohexane, hydrogenated bisphenol A, polyoxyalkylene bisphenol A, polyoxyalkylene hydrogenated bisphenol A, glycerine and pentaerythritol.

4. A process for developing electrostatic latent images which comprises imparting a positive charge to a toner composition as claimed in claim 1 and then applying the toner composition to a copy substrate bearing a negative electrostatic latent image in order to render said latent image visible.

5. A toner composition as claimed in claim 1, in the form of particles having a size of from 5 to 20 microns, admixed with a substance selected from the group consisting of iron powder and glass beads, the amount of said substance being sufficient to impart a strong and uniform positive electric charge to said toner particles.

6. A toner composition as claimed in claim 1, in the form of particles having a size of 5 to 20 microns, blended in an insulating organic carrier liquid to form an electrophotographic developer liquid.

7. A composition as claimed in claim 5, containing from 10 to 100 parts by weight of said substance, per one part by weight of said toner composition.

8. A toner composition as claimed in claim 1, which is charged with a positive electric charge.

9. A toner composition as claimed in claim 1, containing from 3 to 10 parts by weight of said colorant, and said colorant is a pigment or dye or mixture thereof, for developing electrostatic latent images.

10. A toner composition as claimed in claim 7, which is charged with a positive electric charge.

* * * * *